(12) United States Patent
Chen et al.

(10) Patent No.: US 10,110,546 B2
(45) Date of Patent: Oct. 23, 2018

(54) SOCIAL INCENTIVE OPTIMIZATION IN ONLINE SOCIAL NETWORKS

(71) Applicant: Microsoft Technology Licensing, LLC, Redmond, WA (US)

(72) Inventors: Bee-Chung Chen, San Jose, CA (US); Guangde Chen, Milpitas, CA (US); Deepak Agarwal, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 15/140,778

(22) Filed: Apr. 28, 2016

(65) Prior Publication Data
US 2017/0317964 A1 Nov. 2, 2017

(51) Int. Cl.
G06F 15/16 (2006.01)
H04L 12/58 (2006.01)
H04L 29/08 (2006.01)

(52) U.S. Cl.
CPC .............. H04L 51/32 (2013.01); H04L 51/12 (2013.01); H04L 51/16 (2013.01); H04L 67/02 (2013.01); H04L 67/306 (2013.01)

(58) Field of Classification Search
CPC .......................... H04L 29/08072; H04L 29/06
USPC ....................... 709/220, 224, 228; 370/395.5
See application file for complete search history.

(56) References Cited

U.S. PATENT DOCUMENTS

| | | | |
|---|---|---|---|
| 8,332,512 B1* | 12/2012 | Wu .................... | G06Q 30/0254 705/319 |
| 8,725,858 B1* | 5/2014 | Wu .................... | G06Q 30/0254 370/395.5 |
| 8,886,723 B1* | 11/2014 | Gargi .................... | G06Q 10/10 709/204 |
| 9,177,065 B1* | 11/2015 | Ben-Yair ................ | G06Q 50/01 |
| 9,223,835 B1* | 12/2015 | Mazniker .......... | G06F 17/30867 |
| 9,489,685 B2* | 11/2016 | Menn ...................... | H04L 67/10 |
| 9,712,577 B2* | 7/2017 | Shaw .................. | H04L 12/1822 |
| 2008/0319829 A1* | 12/2008 | Hunt ...................... | G06Q 30/02 705/7.29 |
| 2010/0062840 A1* | 3/2010 | Herrmann ............... | G07F 17/32 463/25 |
| 2012/0150971 A1* | 6/2012 | Bahrainwala ........ | G06Q 10/107 709/206 |
| 2013/0346172 A1* | 12/2013 | Wu .................... | G06Q 30/0214 705/14.16 |

* cited by examiner

Primary Examiner — Khanh Dinh
(74) Attorney, Agent, or Firm — Schwegman Lundberg & Woessner, P.A.

(57) ABSTRACT

A social networking system receives from a member an item for sharing on the social networking system. The system determines whether the item for sharing is a first sharing for the member or whether the member has not shared an item for a time period that transgresses a threshold. When the item for sharing is a first sharing or a sharing that transgresses the threshold, the system marks the item for a promotion in a feed of another member of the social networking system.

17 Claims, 6 Drawing Sheets

SOCIAL INCENTIVE OPTIMIZATION IN ONLINE SOCIAL NETWORKS

TECHNICAL FIELD

The present disclosure generally relates to the technical field of online social networking services, and in an embodiment, but not by way of limitation, to social incentive optimization in online social networks.

BACKGROUND

Most online social networks provide a mechanism for users to broadcast messages to their personalized network through actions like shares and tweets. Receiving positive feedback from the network such as likes, comments, and retweets in response to such actions can provide a strong incentive for the users to broadcast more often in the future. These interactions that influence a user to perform certain desirable future actions can be referred to as social incentives. For example, a user may want to broadcast an article to his or her network by sharing it. After the article shared by the user receives positive feedback such as a "like" from a friend, it can potentially encourage the user to continue sharing more regularly. Typically, for every user's visit to an online social network site, good messages need to be ranked and selected from a large set of candidate messages broadcasted in the user's personalized network by a recommender system.

DESCRIPTION OF THE DRAWINGS

Some embodiments are illustrated by way of example and not limitation in the accompanying drawings, in which.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

The present disclosure describes methods, systems; and computer program products for optimizing social incentives in an online social networking service. More specifically, the methods, systems, and computer program products receive from a member of the social networking service an item for sharing on the social networking service. The online social networking service determines whether the item for sharing is a first sharing by the member or whether the member has not shared an item for a time period that transgresses a threshold. When the item for sharing is a first sharing or a sharing that transgresses the threshold, the online social networking service marks the item for a promotion in a feed of another member of the social networking system. Further details regarding this social incentive optimization for the online social networking service are provided herein.

Figure 1:
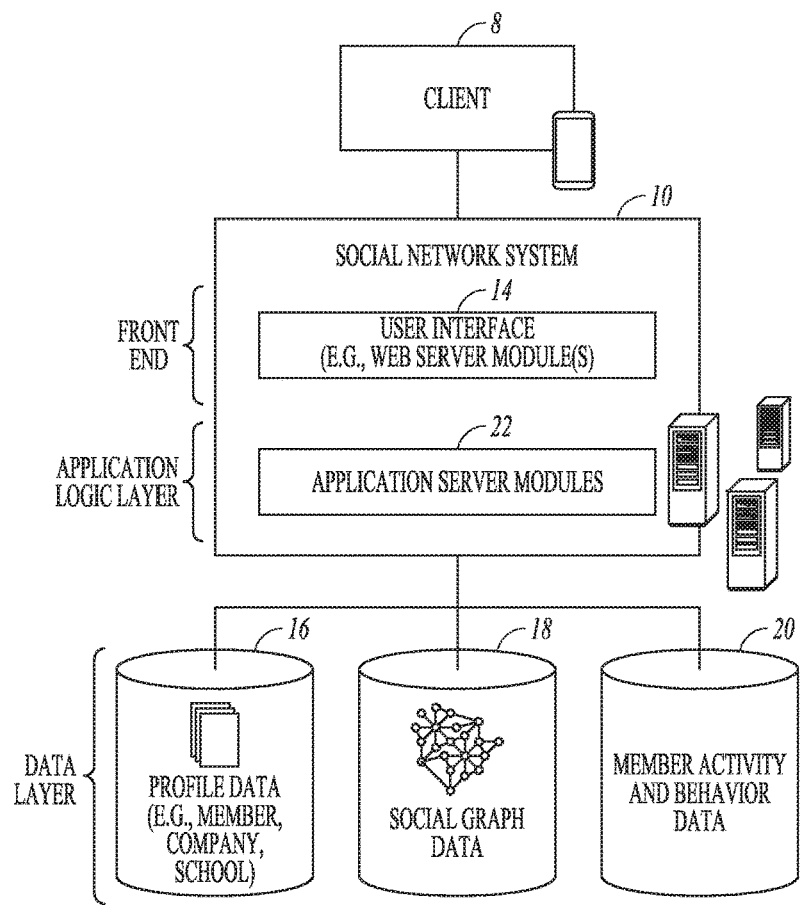
FIG. 1 is a block diagram of the functional modules or components that comprise a computer network-based online social networking service, including application server modules consistent with some embodiments of the invention.

FIG. 1 is a block diagram of the functional modules or components that comprise a computer-based or network-based online social networking service 10 consistent with some embodiments of the invention. As shown in FIG. 1, the online social networking service 10 is generally based on a three-tiered architecture, comprising a front-end layer, application logic layer, and data layer, and can communicate with a client device 8. As is understood by skilled artisans in the relevant computer and Internet-related arts, each module or engine shown in FIG. 1 represents a set of executable software instructions and the corresponding hardware (e memory and processor) for executing the instructions. To avoid obscuring the present subject matter with unnecessary details, various functional modules and engines that are not germane to conveying an understanding of the present subject matter have been omitted from FIG. 1. However, a skilled artisan will readily recognize that various additional functional modules and engines may be used with an online social networking service, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the present subject matter is by no means limited to such architecture.

As shown in FIG. 1, the front end comprises a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the online social networking service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the online social networking service. A "connection" may require a bi-lateral agreement by the members, such that both members acknowledge the establishment of the connection. The degree of connectivity refers to the amount or number of connections that exist for a particular person and/or the amount or number of connections among a group of persons. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the online social networking service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generate various user interfaces (e.g., web pages) with data retrieved from various data sources in the data layer. With some embodiments, individual application server modules 22 are used to implement the functionality associated with various online applications, services and features of the online social networking service. For instance, a messaging application, such as an email application, an instant messaging application, or some hybrid or variation of the two, may be implemented with one or more application server modules 22. Of course, other applications or services may be separately embodied in their own application server modules 22.

The online social networking service may provide a broad range of applications and services that allow members the opportunity to share and receive information, often customized to the interests of the member. For example, with some embodiments, the online social networking service may include a photo sharing application that allows members to upload and share photos with other members. As such, at least with some embodiments, a photograph may be a property or entity included within a social graph. With some embodiments, members of an online social networking service may be able to self-organize into groups, or interest groups, organized around a subject matter or topic of interest. Accordingly, the data for a group may be stored in a database. When a member joins a group, his or her membership in the group will be reflected in the social graph data stored in the database with reference number 18. With some embodiments, members may subscribe to or join groups affiliated with one or more companies. For instance, with some embodiments, members of the online social networking service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 18.

Figure 2:
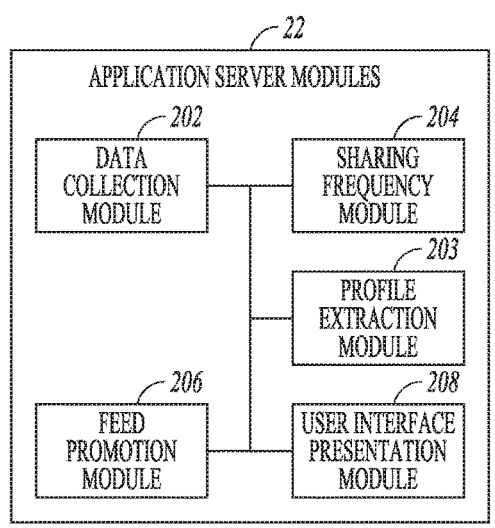
FIG. 2 is a block diagram depicting some example application server modules of FIG. 1.

FIG. 2 is a block diagram depicting some example application server modules 22 of FIG. 1. A data collection module 202 may be configured to collect, for example, items to be shared by a member and social incentives by another member, such as an indication that the other member liked the item that was shared. Other data that can be collected by the data collection module 202 include profile data, behavior data, endorsement data, online social networking service data, occupation data, and connectivity data. A profile extraction module 203 extracts data from profiles of the members of the online social networking system. A sharing frequency module 204 can determine whether a sharing by a member is a first sharing by that member, or if not the first sharing by the member, when the last time was that the member shared an item on the social networking system. A feed promotion module 206 determines whether to promote a particular sharing in the feeds of others. As detailed later herein, such promotion can be based on the fact that the sharing is a first sharing for the member, or it can be based on the fact that the member has not shared an item in a while. Also, the promotion can be based on the fact that the other member has a high frequency of providing social incentives (that is, for example, the other member responds to shared items with a high frequency of "likes."). The feed promotion module 206 also marks items for promotion in feeds. A user interface presentation module 208 generates a user interface for presentation to the user. The user interface may include information pertaining to a news feed provided to a user or a social incentive provided to a member who shared an item.

With the background of FIGS. 1 and 2 in mind, users in an online social network interact with one another through messages such as status updates, tweets, and shares (i.e., sharing activities) of articles, images, videos and other useful information. They also give feedback to one another through comments, likes, retweets, re-shares, mentions, messages, and other ways of communication. Some of such social interactions can have strong influence over a user's behavior. As noted above, these social interactions that influence a user to perform a certain type of action are referred to as social incentives for that type of action. For example, a healthy online social network needs engaged users who frequently share content to drive its ecosystem. "Likes" from friends of a sharer can potentially encourage the sharer to share more in the future. Another example is that online social network sites usually derive revenue by providing ad targeting based on their user profiles. Positive comments on a user's profile from his or her friends can potentially encourage the user to keep his or her profile up to date. Given a type of desirable action (e.g., sharing more content or keeping the profile up to date), how to identify and utilize social incentives (e.g., likes and comments) is an important problem that has not received sufficient attention.

Consequently, this disclosure relates to a novel recommendation problem—that is, how should messages be recommended to users in order to incentivize the users' neighbors (e.g., sharers connected to them) and optimize the likelihood of the neighbors to perform desirable actions (e.g., to share more content) in the future without significantly hurting overall engagement. This problem can be referred to as social incentive optimization. In short, positive social feedback (response by members in the personal network) to messages broadcasted by a user increases his or her likelihood of broadcasting more frequently. Using this observation, a novel framework incentivizes users to share more content on an online social networking system without significantly hurting overall click through rates (CTR) across visits to feeds in the online social network. In short, social incentive optimization is effective for converting more users from infrequent sharers to frequent sharers in online social networks.

Recommender systems (RS) are typically used in online social network sites to rank and select messages for each user visit in order to optimize objectives like click-through rate (CTR). The usage of an RS optimizes the experience of the consumers of the messages, called the viewers (since they receive or view the recommended messages). As outlined in this disclosure, a new objective of the RS is to optimize for the experience of the producers of the messages, who are cal led the actors (since they perform the desirable actions), by using the RS to increase the chance that the viewers of the messages (or other shared item) give social incentives to the actors. It is noted that the actors do not need to use the RS to receive the benefit since the recommendations are given to the viewers. This scenario can be referred to as social incentive optimization.

Content sharing drives users' engagement with feeds (e.g., news feeds) of online social networks, which deliver to each user content items shared by the user's connections (i.e., other users that this user connects to), so that the user can read, like, comment on or re-share those items. It can be important for an online social network system to grow the set of sharers who frequently share content. One strategy to increase the number of frequent sharers is to identify and utilize social incentives that can increase the probability that an infrequent sharer, who has never shared an item before, or who just shared an item after a long period of no sharing activity, shares a second time in the near future. In this problem setting, the actors (to be incentivized) are infrequent sharers, the desirable action of an actor is to share a second time after he/she starts to share an item, the viewers are the connections of infrequent sharers, and an RS will be used to promote the actors in the feeds of the viewers in order to increase the chance that the viewers give social incentives to the actors.

Social incentive optimization seeks to solve the sharer retention problem through (a) offline causal analysis that identifies social incentives, via (b) a recommendation method that decides which actors are to be promoted in which viewers' news feed in a way that does not hurt the viewers' feed experience.

A social incentive optimization problem consists of an actor utility function u and a viewer cost function c both defined on a space of possible recommendation plans x.

For a recommendation plan x, a is denoted an actor and v is denoted a viewer. The solution to a social incentive optimization problem is a recommendation plan (or simply a plan) $x=\{x_{av}\}_{\forall (a,v)}$, where $x_{av} \in \{1,0\}$ represents whether to recommend actor a to viewer 12, which can be determined periodically (e.g., daily) or implemented as a function to be computed on the fly whenever there is a need to generate recommendations for a viewer. Recommending an actor to a viewer can be done in different ways, for example, by promoting a content item shared by the actor in the (news) feed of the viewer. The value $x_{av}$ can also be relaxed to be real between 0 and 1 to represent the probability of recommending actor a to viewer v. The following $x_{av}=\{x_{av}\}_{\forall v}$ can be used to denote the plan projected on actor a, and $x_v=\{x_{av}\}_{\forall a}$ can be used to denote the plan projected on viewer v.

An actor utility function $u(a|x)$, which has a utility $u(a|x)$ of plan x for actor a, which is the expected number of desirable actions to be performed by actor a given the plan. If the goal is to achieve at least one desirable action by an actor, $u(a|x)$ is the probability that a performs a desirable action. The expression $\gamma_a=\{\gamma_{av}\}_{\forall v}$ denotes a vector of random variables, each $\gamma_{av}$ of which represents the number of social incentives that viewer v gives actor a. The vector $\gamma_a$ can be referred to as the incentive vector of actor a, and $p(\gamma_a|x)$ can be used to denote the conditional probability of observing incentive vector $\gamma_a$ giving plan x. A higher number of social incentives $\gamma_{av}$ is expected when viewer v is recommended to actor a (i.e., $x_{av}=1$) than in the case in which viewer v is not recommended to actor a (i.e., $x_{av}=0$). The function $y(a|\gamma_a)$ is the outcome function, which represents the expected number of desirable actions by a given the incentive vector $\gamma_a$. Then, the following holds:

$$u(a \mid x) = \sum_{\text{all possible } \gamma_a} y(a \mid \gamma_a) p(\gamma_a \mid x). \quad (1)$$

The above expectation can be difficult to compute due to high dimensionality of $\gamma_a$. Also, in general, it cannot be assumed that $p(\gamma_a|x)$ depends only on the plan $x_a$ projected on actor a. Recommending a together with many other actors to a viewer v (i.e., $x_v$ has many non-zero entries) will reduce v's attention on a (thus low chance of receiving incentives) compared to the case in which only a is recommended to v (i.e., $x_v$ consists of all zeros except for $x_{uv}=1$). However, independence assumptions will later be introduced to make the problem computationally trackable. In practice, $y(a|\gamma_a)$ and $p(\gamma a|x)$ are predicted using statistical models, which also use features of actors and viewers, trained on data collected in the past. To simplify notations, actor features and viewer features are not added to the input parameters of these prediction functions.

A viewer cost function, $c(v|x_v)$, is the cost $c(v|x_v)$ of plan x for viewer v and is the expected drop of engagement of viewer v given the plan due to the possibility of recommending irrelevant actors to the viewer. For example, if CTR(v) denotes the click through rate of viewer v in his/her news feed without any actor recommendations and CTR $(v|x_v)$ denotes the click through rate of viewer v in his/her news teed given that actors in his/her feed are recommended according to plan $x_v$, then the following can be defined:

$$c(v|x)=CTR(v)-CTR(v|x_v).$$

For the social incentive optimization problem, given the definitions of utility and cost, the actor utility function u(a|x) and the viewer cost function $c(v|x_v)$ are first estimated, and then the following constrained optimization problem is solved:

$$\arg\max_x \sum_a u(a|x) \quad (2)$$
$$\text{s.t. } c(v|x_v) \leq \theta, \text{ for all } v,$$

where $\theta$ is a given threshold.

Now, a counterfactual model for incentivizing infrequent sharers is first described, and a doubly robust estimator to estimate the average causal treatment effect from observational data is derived, adjusting appropriately for confounding factors. And then causal effect data analysis is used to identify that social incentives can be a cause of infrequent sharers becoming more frequent sharers.

The variable R is a causal exposure indicator of receiving a social incentive that takes on two values—R is equal to 1 for users of the population who are expected to receive social incentives; and R is equal to 0 for members of the population who are expected not to receive any social incentive. The variable X is denoted as a vector of emaciates measured prior to receipt of treatment, and the variable Y is denoted as the observed outcome. Observed data are then independent and identically distributed copies $(Y_i, R_i, X_i)$ for each user, where i=1, . . . , n. Assuming that each user has an associated random vector $(Y_i^0, Y_i^1)$, where $Y_i^0$ and $Y_i^1$ are the potential outcomes if a user did not receive social incentive or received social incentive respectively. However, not all the users can be seen with both $Y_i^0$ and $Y_i^1$ simultaneously. Instead, the potential outcome $Y_i$ could be actually observed as the following:

$$Y_i = R_i \times Y_i^1 + (1-R_i) \times Y_i^0, \quad (3)$$

If $user_i$ was expected to receive a social incentive, then $R_i=1$ and $Y_i=Y_i^1$. On the contrary, if $user_i$ was expected not to receive any social incentive, then $R_i=0$ and $Y_i=Y_i^0$.

The distributions of $Y^1$ can be viewed as representing how outcomes in the population would turn out were all users expected to receive a social incentive, while the distributions of $Y^0$ may be thought of as representing the hypothetical distribution for the whole population of users were all users expected not to receive any social incentive. Although $Y^1$ and $Y^2$ cannot be observed simultaneously, they are a convenient construction of allowing precise statement for causal inference. $Y^1$ and $Y^0$ are also referred to as counterfactuals in the literature. S. Morgan and C. Winship. *Counterfactuals and Causal Inference*. Cambridge University Press, 2007. Consequently, the counterfactual model can be formally written as $$\Delta = \mu_1 - \mu_0 = E(Y^1) - E(Y^0) \quad (4)$$

In the social incentive problem defined above, a binary outcome is desired whether an infrequent sharer will share again or not. For a binary outcome, $E(Y^0)=P(Y^0=1)$ and $E(Y^1)=P(Y^1-1)$. Therefore, (4) can be transferred to $$\Delta = \mu_1 - \mu_0 = P(Y^1=1) - P(Y^0=1), \quad (5)$$

where, $P(Y^1=1)$ is denoted as the probability that users will share new content again after they received the social incentive. The probability $P(Y^0=1)$ is viewed as the probability that users will share new content again if they did not receive any social incentive.

The inference based on Equation (5) can be viewed as the risk difference between a treated group and a control group. In an interesting problem, the probability difference to share new content again between the group who received social incentive and the group who did not receive any social incentive can be derived. Another inference can be made on risk ratio (or probability ratio) as below:

$$\gamma = \mu_1/\mu_0 = P(Y^1=1)/P(Y^0=1) \quad (6)$$

Whenever this probability difference is positive or the probability ratio is grater than 1, there is a positive impact for users to receive a social incentive. Therefore, receiving social incentives for the users from their connections is necessary. However, the valid inference relies on whether the estimation of $P(Y^1=1)$ and $P(Y^0=1)$ can be identified from the Observed data (Y, R, X).

For the doubly robust estimator, in the Observed data (Y, R, X), R is usually not independent of $(Y^0, Y^1)$ because a user does not receive social incentives randomly. In this case, $P(Y^0=1) \neq P(Y=1|R=1)$ or $P(Y^0=1) \neq P(Y=1|R=0)$. $P(Y^1=1)$ or $P(Y^0=1)$ is the probability of sharing new content again if all the users received social incentives or did not receive social incentives respectively, while $P(Y|R=1)$ or $P(Y|R=0)$ is the probability of sharing new content again only for observed users who received social incentives or did not receive social incentives. Therefore, the probability difference of Equation (5) and the probability ratio of Equation (6) are not the unbiased estimators of $\Delta$ and $\gamma$. To derive better estimators from observed data, one may need to make an assumption that there is no measured confounder. J. Robins, M. Hunan, and B. Brumback. Marginal Structural Models and Causal Inference in Epidemiology. *Epidemiology*, 11:550-560, 20040. A confounder can be treated as a covariate that is associated with both potential outcomes and treatment state. Given that X includes all the confounders, there would be no relationship between the exposure state and the potential outcome for users sharing a particular value of X. That is, $(Y^0, Y^1)$ is independent of R conditioning on X and it is formally written as $$(Y^0, Y^1) \perp R | X \quad (7).$$

With assumption (7), one can estimate $\Delta$ in Equation (5) by regression modeling and inverse propensity score weighting.

In the regression modeling, $$E\{P(Y=1|R=1, X)\} = E\{P(Y^1=1|R=1, X)\} =$$
$$E\{P(Y^1=1|X)\} = E\{E(Y^1|X)\} = E(Y^1) = P(Y^1=1)$$

Similarly, $$E\{P(Y=1 \mid R=0, X)\} = (E\{P(Y^0=1 \mid R=0, X)\} = $$
$$E\{P(Y^0=1 \mid X)\} = E\{E(Y^0 \mid X)\} = E(Y^0) = P(Y^0=1).$$

Therefore, an unbiased estimator of $\Delta$ for Equation (5) can be written as follows, $$\Delta = \mu_1 - \mu_0 = E\{P(Y=1 \mid R=1,X) - P(Y=1 \mid R=0,X)\} = E\{m_1(X,\alpha_1) - m_0(X,\alpha_0)\}, \quad (8)$$

where $m_1(X, \alpha_1)$ and $m_0(X, \alpha_0)$ are outcome regression models and can be estimated by $m_1(X, \hat{\alpha}_1)$ and $m_0(X, \hat{\alpha}_0)$ from two observed groups R=1 and R=0. Equation (8) suggests that two logistic regressions can be fitted for two different groups R=1 and R=0, and then the resulting estimates of probability difference $P(Y=1|R=1,X)-P(Y=1|R=0, X)$ can be averaged over all the observed X in order to estimate the $\Delta$. However, an estimation of $\Delta$ via regression modeling requires that the regression model is correctly specified. If not, the average of the probability difference may not be the consistent estimator of $\Delta$.

In the inverse propensity score weighting, the propensity score $e(X)=P(R=1|X)=E\{I(R=1)|X\}$, where $0<e(X)<1$, is the probability of receiving social feedback given the observed covariates X. In practice, it is unlikely to obtain true values of e(X) directly, but the values can be estimated from the observed data $(R_i, X_i)$, i=1, ..., n, by using a parametric model, e.g., a logistic regression model, $$e(X, \beta) = P(R=1 \mid X) = \frac{\exp(X^T\beta)}{(1+\exp(X^T\beta))}, \quad (9)$$

where $\beta$ is an p×1 parameter. With the propensity score and the assumption that there is no measured confounder, it can be shown that $$(Y^0, Y^1) \perp R \mid e(X), \quad (10),$$

which implies that exposure R is not related to the counterfactuals $(Y^0, Y^1)$ for users with the same propensity score. P. R. Rosenbaum and D. B Rubin. The Central Role of the Propensity Score in Observational Studies for Causal Effects. *Biometrika*, 70(1):41-55, 1983.

$$E\left\{\frac{RY}{e(X)}\right\} = E\left\{\frac{RY^1}{e(X)}\right\} = E\left[E\left\{\frac{RY^1}{e(X)} \mid Y^1, X\right\}\right] = E\left[\frac{Y^1}{e(X)} E(R \mid Y^1, X)\right] = $$
$$E\left[\frac{Y^1}{e(X)} E\{I(R=1) \mid X\}\right] = E\left[\frac{Y^1}{e(X)} e(X)\right] = E(Y^1)$$

The first equality is because of $$RY = R(RY^1 + (1-R)Y^0) = R^2 Y^1 + R(1-R)Y^0 = R^2 Y^1 = RY^1$$

The fourth equality is due to the assumption (10). Similarly, $$E\left\{\frac{(1-R)Y}{1-e(X)}\right\} = E(Y^0).$$

If e(X) is the true propensity score and it can be estimated by $e(X, \hat{\beta})$, then $$n^{-1} \sum_{i=1}^{n} \frac{R_i Y_i}{e(X_i, \hat{\beta})}$$

can be used to estimate $$E\left\{\frac{(RY)}{e(X)}\right\}$$

by the large number of law. Similarly, $$E\left\{\frac{(1-R)Y}{1-e(X)}\right\}$$

is the consistent estimator of $$n^{-1} \sum_{i=1}^{n} \frac{(1-R_i)Y_i}{1-e(X_i, \hat{\beta})}$$

in practice. Consequently, $\Delta$ in Equation (3) can be estimated by the difference of inverse propensity score weighted averages (P. Rosenbaum. Propensity Score. *Encyclopedia of Biostatistics*, 5:3551-3555, 1998):

$$\hat{\Delta} = n^{-1} \sum_{i=1}^{n} \frac{R_i Y_i}{e(X_i, \hat{\beta})} - n^{-1} \sum_{i=1}^{n} \frac{(1-R_i)Y_i}{1-e(X_i, \hat{\beta})}, \quad (11).$$

Inverse propensity score weighting creates a pseudo-population in which there is no confounding, so that the weighted averages reflect averages in the true population. Estimation of $\Delta$ from Equation (11) requires that the postulated propensity score model in Equation (9) is correctly specified and must be identical to the true propensity score. If not, $\hat{\Delta}$ in Equation (11) may be not the consistent estimator of $\Delta$.

An estimator for $\Delta$ based on regression modeling requires a correct postulated regression model, while an estimator for $\Delta$ based on inverse propensity score weighting requires a correct postulated propensity model. J. Robins, A. Rotnitzky, and L. Zhao. Estimation Of Regression Coefficients When Some Regressors Are Not Always Observed. *Journal of the American Statistical Association*, 89:846-7866, 1994. Both approaches can be combined and a doubly robust estimator (M. Funk and C. Wiesen. Double Robust Estimation of Causal Effects. *American Journal of Epidemiology*, 173(7):761-767, 2011.) for $\Delta$ can be defined as follows, $$\hat{\Delta}_{DR} = n^{-1} \sum_{i=1}^{n} \left[ \frac{R_i Y_i}{e(X_i, \hat{\beta})} - \frac{R_i - e(X_i, \hat{\beta})}{e(X_i, \hat{\beta})} m_1(X_i \hat{\alpha}_1) \right] - n^{-1} \sum_{i=1}^{n} \left[ \frac{(1-R_i)Y_i}{1-e(X_i, \hat{\beta})} + \frac{R_i - e(X_i, \hat{\beta})}{1-e(X_i, \hat{\beta})} m_0(X_i \hat{\alpha}_0) \right] = \hat{\mu}_{1,DR} - \hat{\mu}_{0,DR}, \quad (12)$$

where $e(X_1, \hat{\beta})$ is a postulated model for the true propensity score (9) and can be estimated by fitting a logistic regression; $m_1(X, \hat{\alpha}_1)$ and $m_0(X, \hat{\alpha}_0)$ are postulated models for the true regressions (8) and can be fitted by least square. By the large law of number and the assumption (10), (J. Lunceford and M. Davidian. Stratification and Weighting via the Propensity Score in Estimation of Causal Treatment Effects: A Comparison Study. *Statistics in Medicine*, 23:2937-2960, 2004.) it can be derived that $$\hat{\mu}_{1,DR} = E\left[\frac{RY}{e(X,\beta)} - \frac{R - e(X,\beta)}{e(X,\beta)} m_1(X, \alpha_1)\right] = \quad (13).$$

$$E(Y^1) + E\left[\frac{R - e(X,\beta)}{e(X,\beta)}(Y^1 - m_1(X, \alpha_1))\right],$$

Equation (13) shows that there are two components for $\hat{\mu}_{1,DR}$. One is the mean outcome if all the users had received social feedback. The other is represented by taking the product of 2 bias terms—one from the propensity model and one from the outcome regression model. If either $e(X_i, \hat{\beta})$ is the true propensity score or $m_1(X, \hat{\alpha}_1)$ is the true regression model, then the second component reduces to zero. So $\hat{\mu}_{1,DR}$ is an unbiased estimator of $E(Y_1)$ under the condition that $e(X_i, \hat{\beta})$ is the true propensity score and/or $m_1(X, \hat{\alpha}_1)$ and $m_0(X, \hat{\alpha}_1)$ are the true regression models. Likewise, $\hat{\mu}_{0,DR}$ is an unbiased estimator of $E(Y_0)$. Therefore, $\hat{\Delta}_{DR}$ is an unbiased estimator of $\Delta$. If the regression model is incorrect but the propensity model is correct, or if the propensity model is incorrect but the regression model is correct, $\hat{\Delta}_{DR}$ is still a consistent estimator of $\Delta$. This property is referred to as double robustness. If the propensity model is correctly specified, the doubly robust estimator will have smaller variance than the simple inverse propensity score weighted estimator. D. Horvitz and D. Thompson. A Generalization of Sampling without Replacement from a Finite Universe. *Journal of the American Statistical Association*, 47:663-685, 1952. If the regressions are modeled correctly, the doubly robust estimator may have a larger variance than the regression estimator, but it gives protection in the event it is not. That is, the doubly robust estimator offers protection against mismodeling.

In a summary, the doubly robust estimator can estimate the probability difference with the following four steps.

Step 1—Estimate the propensity score $e(X, \hat{\beta})$ in Equation (9) using all the observed data.

Step 2—Fit an outcome regression $m_1(X, \hat{\alpha}_1)$ using only the data from the group R=1 and predict all outcome response $\hat{Y}_{m_1}$ using $m_1(X, \hat{\alpha}_1)$. Then evaluate $$\frac{R(Y - \hat{Y}_{m_1})}{e(X, \hat{\beta})} + \hat{Y}_{m_1}$$

for all the data, denoted as $DR_1$.

Step 3—Fit an outcome regression $m_0(X, \hat{\alpha}_0)$ using only the data from the group R=0, and predict all outcome response, $\hat{Y}_{m_0}$ using $m_0(X, \hat{\alpha}_0)$. And evaluate $$\frac{(1-R)(Y - \hat{Y}_{m_0})}{1 - e(X, \hat{\beta})} + \hat{Y}_{m_0}$$

for all the data as well, denoted as $DR_0$.

Step 4—Take the difference between mean of $DR_1$ and mean of $DR_0$ and use it as the estimation of $\Delta$ in Equation (5).

In Step 2, for the users who did not receive any social incentive, outcome response is predicted using the training model from the groups who received social incentives because R=0 and $DR_1 = Y_{m_1}$. For the users who received social incentives, the predicted outcome needs to be adjusted by propensity score. Similarly, in Step 3, outcome response for group R=1 is predicted using the training model from the groups who did not receive any social incentive and the predicted outcome is adjusted for group R=0 by propensity score.

It can be important to recognize that covariates X may not be linearly related with outcomes and the exposure state R. In this case, an incorporate smoothing spline may be incorporated (G. Wahba. *Spline Models for Observational Data*. SIAM: Society for Industrial and Applied Mathematics, 1990.) for better estimations for propensity scores in Equation (9) and two regression models $m_1(X, \alpha_1)$ and $m_0(X, \alpha_0)$ because the doubly robust estimator requires that either propensity score is true or two regression models are correctly specified. The emanates X may also be high-dimensional. Ordinal least square may not yield stable and consistent results for regression models because of highly collinearity for the covariates X, etc. Before fitting the model, a dimension selection method, e.g., Least Absolute Shrinkage and Selection Operator (R. Tishirani. Regression Shrinkage and Selection via the Lasso. *Journal of the Royal Statistical Society. Series B. (Methodological)*, 58(1):267-288, 1996.), may be applied to enhance the prediction accuracy for $m_1(X, \alpha_1)$ and $m_0(X, \alpha_0)$. After the regularization, the distributions of some confounders may not overlap substantially in both $m_1(X, \alpha_1)$ and $m_0(X, \alpha_0)$ resulting in the regression relationship being determined primarily by $m_1(X, \alpha_1)$ in some region of the X space and by $m_0(X, \alpha_0)$ in another. To avoid such a situation, a union may be formed for the selected covariates from both $m_1(X, \alpha_1)$ and $m_0(X, \alpha_0)$, and then the models are refitted with these common covariates.

Figure 3:
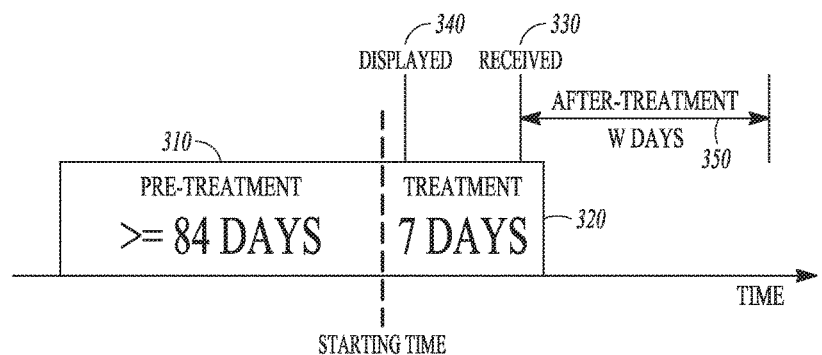
FIG. 3 illustrates data relating to infrequent sharers.

FIG. 3 illustrates data relating to infrequent sharers, who are defined as users who have shared something recently, but who haven't shared any new content in the past certain time period. In and embodiment, this pre-treatment time period can be set to 84 days (310). For ease of data collection, one can focus on data collected from a feed, one of the best places to receive incentives. The recommender system in the feed may show infrequent sharers' social updates to their connections multiple times in different days. For simplicity, as illustrated in FIG. 1, the social updates are given 7 days to display (320). Further in FIG. 1, the exposure time is defined as the time when the infrequent sharer received incentives (330) or the first time when the recommender system displayed the infrequent sharer's social update if they did not receive any incentives (340). All the covariates X are collected prior to this exposure time. Good performance can be obtained for predictive models by using a large set of covariates. The X can be classified into four sets of covariates. The first set includes the member age after the users join the online social networking system as members and the connection counts, which are also the most important covariates for a user to become a sharer and to receive incentives. The second set describes the users, such as the locale, languages, etc. The third set is extracted information from their profiles, such as position, education, skills, etc. The fourth set describes the recent activities including the average visits to the group pages, home pages, and content pages, which are the possible places for them to share new content. After the exposure time, the outcome is positive if the users share again within a certain time window W (350), which can include 7 days, 14 days, and 21 days. The 7-day effect can be treated as a short-term impact and it is usually higher than those from other time windows because the group who received incentives may get an email or push notification from the online social networking system. However, the 21-day effect can be viewed as a long-term impact for the reason that both groups who received incentives or not may already visit the online social networking system after their social updates have been exposed to their connections.

The data involved here are high-dimensional. An L1-regularization (J. Friedman, T. Hastie, and R. Tibshirani. Regularization Paths for Generalized Linear Models via Coordinate Descent. *Journal of Statistical Software*, 33:1-22, 2010.) can be used to select important variables to avoid overfitting and 10-fold cross validation can be used to select the best model when fitting the regression models based on the procedure from doubly robust estimators as described above. A bootstrapping (T. DiCiccio and B. Efron. Bootstrap Confidence Intervals. *Statistical Science*, 11:189-228, 1996.) allows assigning measures of confidence intervals for the doubly robust estimators. The original data are randomly drawn with replacement for 100 times and the average of doubly robust estimators is used as the results with 95% confidence intervals.

Figure 4:
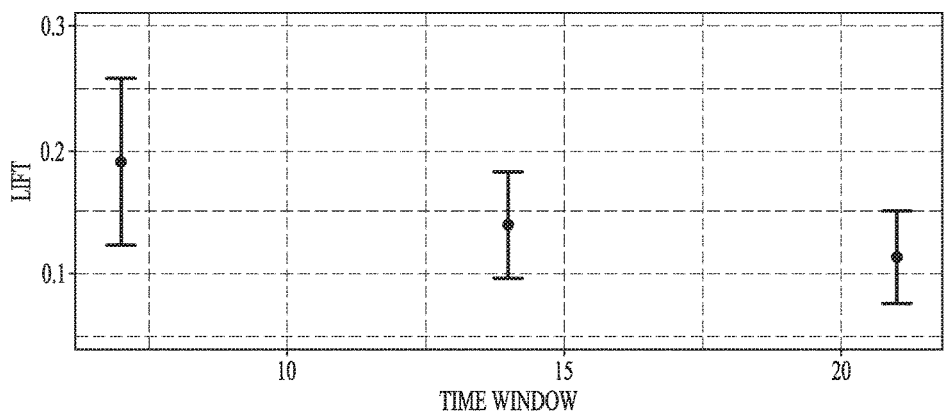
FIG. 4 illustrates more data relating to infrequent sharers.

FIG. 4 shows that infrequent sharers tend to share again once they received social incentives because the lift is positive. The lift refers to the number of infrequent sharers who share again divided by the total infrequent sharers to share again in a control group. Further, with a longer time window, the lift seems to become stable and still positive. The lift is larger in the 7-day time window because email or push notification will make these sharers come back earlier than usual and then make them share again.

Figure 5:
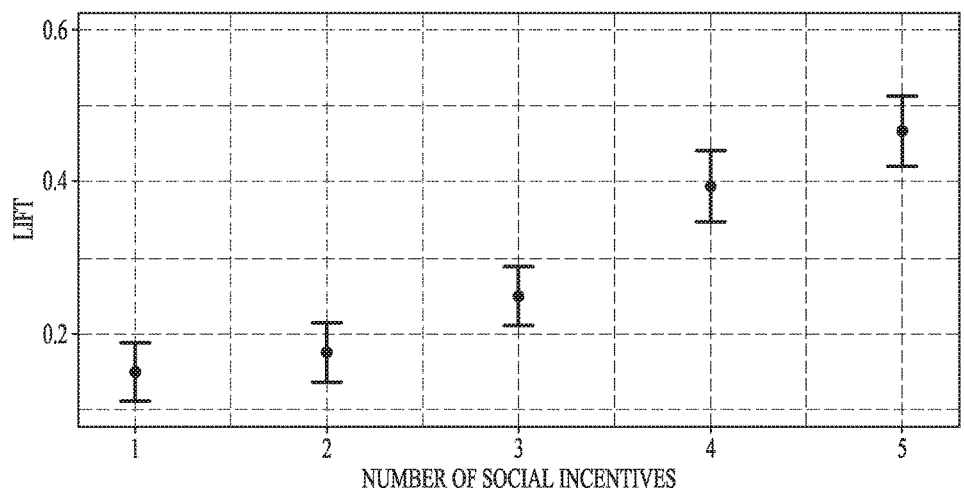
FIG. 5 illustrates more data relating to infrequent sharers.

In FIG. 5, those users who just received a different number of social incentives are isolated and the causal effect is updated for these groups versus the the group that did not receive any social incentives. FIG. 5 suggests that infrequent sharers tend to share again with higher probability when they receive more social incentives.

In particular embodiments, the covariates, member age, and connection counts are the most important features for infrequent sharers to share again and help specify the regression models correctly, which is also the possible requirement for doubly robust estimators to be consistent. Even if some social updates can receive some incentives from other products other than feed, the conclusions from this causal data analysis still hold because receiving social incentive from the group R=0 only makes the lift smaller.

It now will be disclosed how infrequent sharers are recommended to viewers in order to increase the chance that those sharers receive social incentives from the viewers. This recommendation method can be implemented in a news feed or other feed of an online social networking system. In an example online social networking system, every user has a feed of updates from his/her connections (other users connected to him/her). Such updates include status updates, article sharing activities, image sharing activities and others, and are ranked by a relevance model that predicts how much a user is interested in an update. As previously noted, a user who did not have any sharing activity for a long time becomes an infrequent sharer when he/she starts to share an item. The mechanism that is used to recommend an infrequent sharer to a viewer is to promote that sharer's sharing activity at top positions in the viewer's news feed. In an embodiment, since each user only receives updates from his/her connections, the online social networking system can only promote a sharer to viewers who are connected to him/her. After the viewer sees a promoted sharing activity by an infrequent sharer, he/she can give social feedback (i.e., incentives) to the sharer by liking, re-sharing, or commenting on that sharing activity. Such social feedback will be sent to the sharer in an email or through a notification in the online social networking system. In an embodiment, a sharer does not need to use the feed to share content (since sharing can be done by clicking on a share button on the online social networking system) or to receive social incentives (which can be delivered through email s or notifications), even though the recommendation method only make recommendations to feed users.

In an embodiment, the social online networking system identifies a set of infrequent sharers and decides a recommendation plan for them. Infrequent sharers can be easily identified by looking at all the sharers on a day and checking whether they have any sharing activity in the last K days. As previously noted, to decide the recommendation plan, the online social networking system needs to solve the optimization problem:

$$\arg\max_{x} \sum_{a} u(a \mid x)$$

s.t. $c(v|x_v) \leq \theta$, for all v, where $\emptyset$ is a given threshold.

Ideally, it is preferable for the online social networking system to set the viewer cost function as the drop in the viewer's feed CTR due to promoting infrequent sharers (who may or may not share content of the viewer's interest i.e., $c(v|x)=CTR(v)-CTR(v|x_v)$. To simply the problem, the online social networking system verifies that at most one infrequent sharer is promoted in each viewer's news feed; i.e., the constraint becomes:

$$c(v \mid x_v) = \sum_{a} x_{av} \leq 1,$$

for all v, where $x_{av} \in \{1,0\}$

This constraint achieves very small drop in CTR.

To further reduce computational complexity, the actor utility function can be simplified by the following assumptions. Each infrequent sharer a receives at most one social incentive from a viewer v; i.e., $\gamma_{av} \in \{1,0\}$. This is a reasonable assumption since at most one infrequent sharer is recommended to each viewer. The outcome probability (i.e., probability that infrequent sharer a shares again) is linear in the number of incentives and independent of who give the incentives; i.e., it is assumed that)

$$y(a|n \text{ incentives})=y_0^a(\alpha+\beta n)$$

where $y_0^a$ is the outcome probability given no incentive, and $\alpha$ and $\beta$ is the least squares fit to the points in FIG. 5. It is noted that n corresponds to the x-axis and $\alpha+\beta n$ corresponds to the probability ratio on they-axis. Based on FIG. 5, this linearity assumption roughly holds when n is small. That is, a sharer need not be given many incentives.

Given the above two assumptions in the previous paragraph, the expected outcome given a recommendation plan x is $$u(a \mid x) = E_{n \mid x}[y(a \mid n \text{ incentives})] = y_0^a \left( \alpha + \beta \sum_v p(\gamma_{av} = 1 \mid x_{av}) \right),$$

because the expected number of incentives is $\Sigma_v p(\gamma_{av}=1 \mid x_{av})$ where $p(\gamma_{av}=1 \mid x_{av})$ is the probability that viewer v would give sharer a a social feedback (i.e., the action rate of v on a sharing activity from a), which is estimated using the viewer-actor affinity score between v and a. The total utility over all infrequent sharers is:

$$\sum_a u(a \mid x) =$$

$$\sum_a y_0^a \left( \alpha + \beta \sum_v p(\gamma_{av} = 1 \mid x_{av}) \right) = \sum_a y_0^a \alpha + \beta \sum_v \sum_a y_0^a p(\gamma_{av} = 1 \mid x_{av}),$$

where $\Sigma_a y_0^a \alpha$ is independent of x.

Putting the above together, the following optimization problem is obtained:

$$\arg\max_x \sum_v \sum_a y_0^a p(\gamma_{av} = 1 \mid x_{av})$$

s.t. $\Sigma_a x_{av} \leq 1$, for all v, where $x_{av} \in \{1,0\}$

It is easy to see that the following greedy algorithm gives the solution to the above problem—For each v, recommend the infrequent sharer a (i.e., setting $x_{av}=1$) who connects to v and has the highest $y_0^a p(\gamma_{av}=1 \mid x_{av})$.

Figure 6:
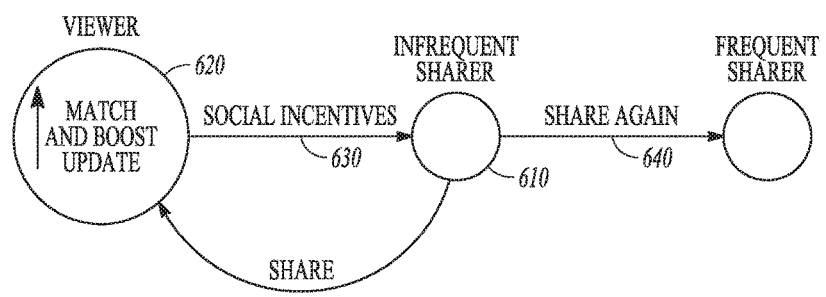
FIG. 6 illustrates a process flow of an example of converting infrequent sharers to frequent sharers.

FIG. 6 summarizes the process of how in an embodiment a recommendation system converts infrequent sharers to frequent sharers. First, the system identifies on a daily basis the frequent sharers (who start to share after a long period of no sharing activity) and determines a recommendation plan (610). Second, the system promotes/boosts the sharing activities of infrequent sharers in the news feeds of certain viewers according to a plan (620). Third, some viewers give social incentives to the promoted infrequent sharers and, through email s and notifications, some infrequent sharers receive the incentive usually within 7 days (630). Fourth, the incentivized infrequent sharers have a higher chance to become frequent sharers (i.e., share again with a time window) (640).

Figure 7A:
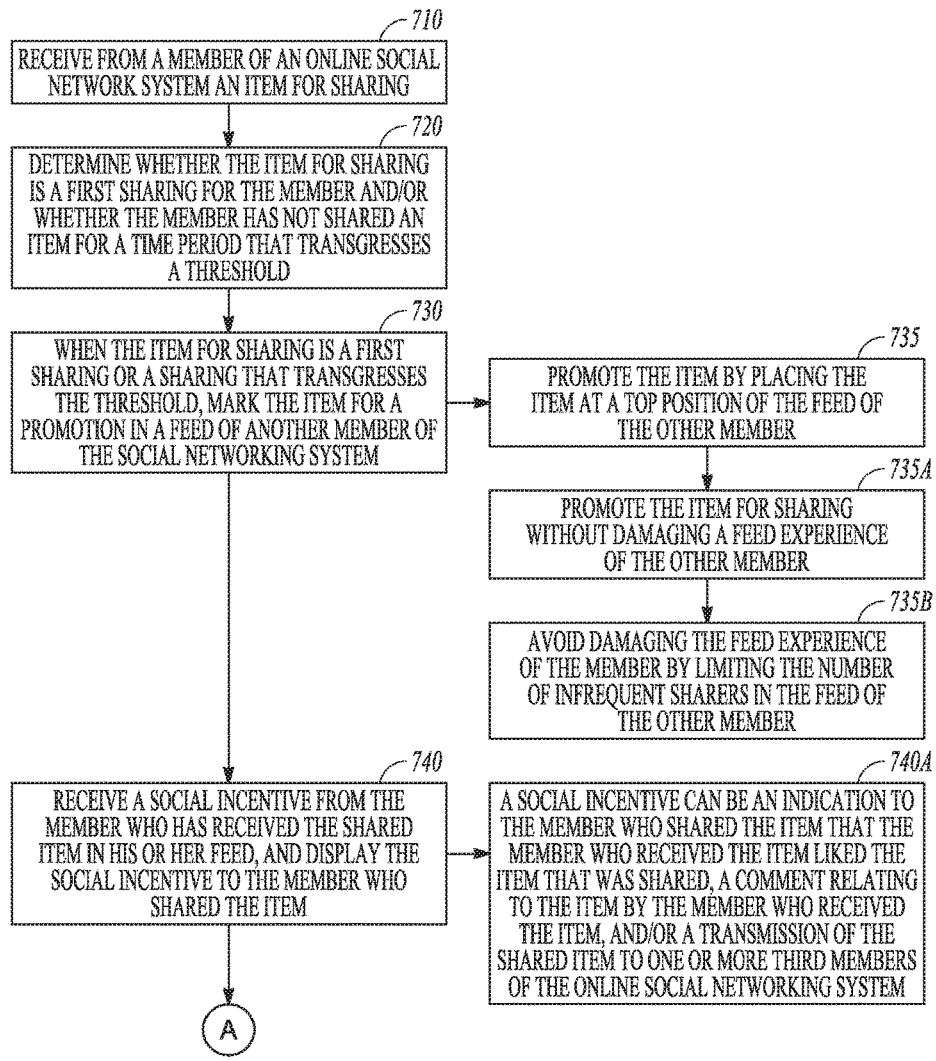
FIGS. 7A and 7B are a flow diagram of an example embodiment of a process to optimize social incentives in an online social networking system.
Figure 7B:
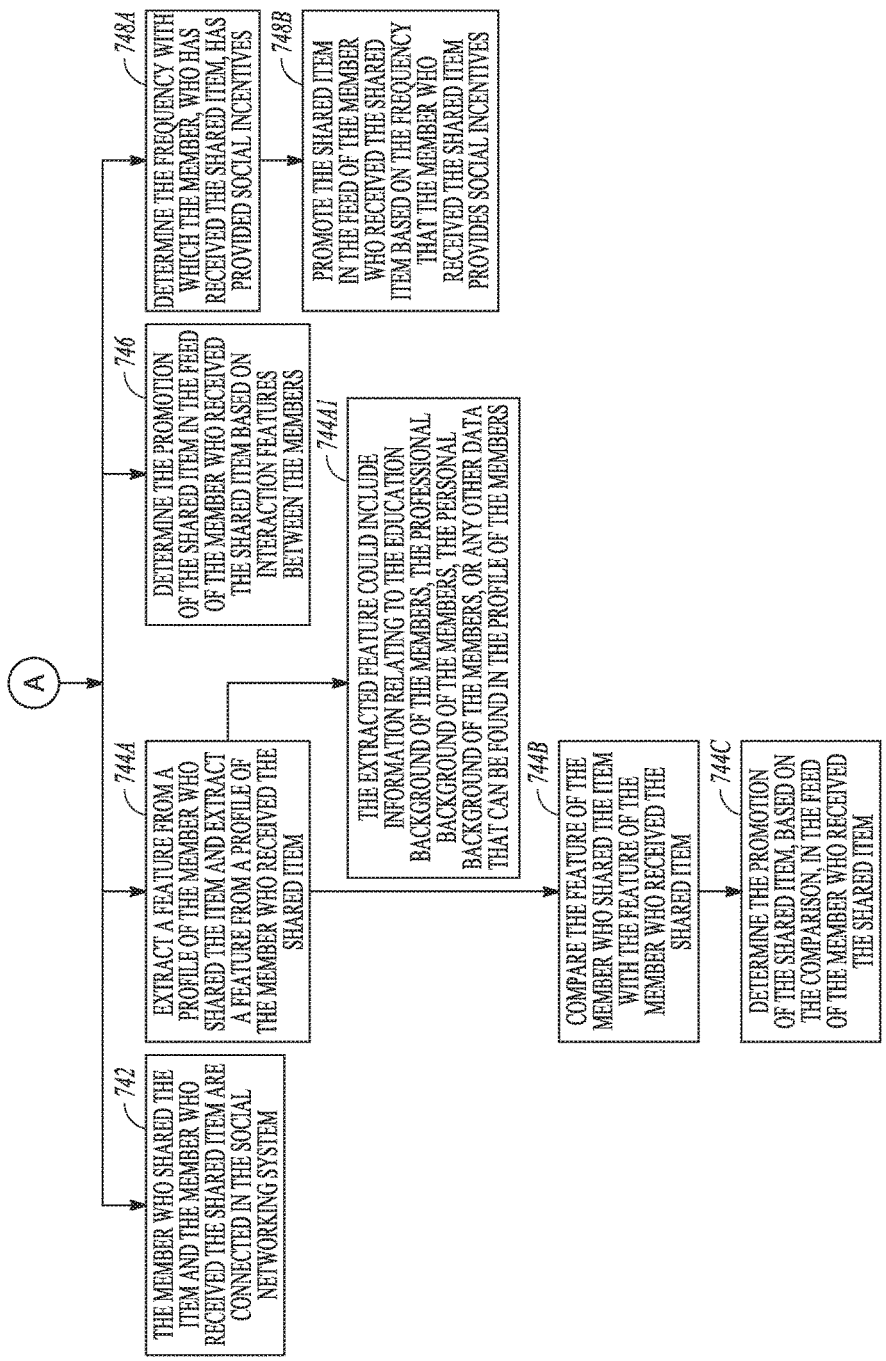

FIGS. 7A-7B are a flow diagram illustrating an example method of optimizing social incentives in an online social networking system. In various embodiments, the method 700 may be implemented by one or more of the modules of FIG. 2. FIGS. 7A-7B include a number of process blocks 705-748B. Though arranged somewhat serially in the example of FIGS. 7A-7B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 7A and 7B, at 710 an online social networking system receives from a member an item for sharing on the social networking system. For example, the item can be an article that the member has read and has found interesting and thought-provoking, and which the user believes may be beneficial to others. The item could also be a piece or commentary written by the member. The item could also be an audio or video clip that the member would like to share. Simply put, the item can be any written, graphic, or audio data or information that the member would like to share with others.

At 720, the online social networking system determines whether the item for sharing is a first sharing for the member and/or whether the member has not shared an item for a time period that transgresses a threshold. The online social networking system can determine this by saving the date that a member first shares an item with other members. If the member has never shared an item with other members, that can be indicated by the storage of a null date in the system. If the member has previously share at least one item with other members, the system can store the date of the last sharing by the member, and then determine if that last sharing was greater than a preset time period (for example, 84 days as indicated above).

At 730, when the item for sharing is a first sharing or a sharing that transgresses the threshold, the online social networking system marks the item for a promotion in a feed of another member of the social networking system.

In an embodiment, as indicated at 735, the online social networking system can promote the item by placing the item at a top position of the feed of the other member. In an online social networking system, the feed of a member is information that is presented to the member, usually in an email or when the member signs on to the online social networking system. For example, the feed can be a news feed that presents the top news stories, business stories, and/or human interest stories of the day to the member. The feed can also include information about other members, such as the job anniversary date of a member, a new job of a member, a new skill posted by a member, or even when the member changes his or her picture in his or her profile on the online social networking system.

At 735A, the online social networking system promotes the item for sharing without damaging a feed experience of the other member. The feed experience of a member relates to the manner in which the feed information is presented to the member and the manner in which the member responds to the feed information, that is, whether the member considers the feed information as informative, helpful, and worthy of the member's attention, or whether the member considers the feed information negatively as a distraction, disruption, and/or not worthy of the member's time or attention. At 735B, the online social networking system avoids damaging the feed experience of the member by limiting the number of infrequent sharers in the feed of the other member. Such limitation quite simply avoids overloading the member with information, thereby maintaining a positive feed experience for the member.

At 740, the online social networking system receives a social incentive from the member who has received the shared item in his or her feed, and displays the social incentive to the member who shared the item. As indicated at 740A, a social incentive can be an indication to the member who shared the item that the member who received the item liked the item that was shared. The social incentive could also be a comment relating to the item by the member who received the item. In another embodiment the social incentive could be a transmission of the shared item to one or more third members of the online social networking system, accompanied by a notice to the member who shared the item that the member who received that shared item that the item was further shared with other members of the online social networking system.

As indicated at 742, the member who shared the item and the member who received the shared item are connected in the social networking system. As is known to those of skill in the art, a connection on an online social network system results when a first member requests such connection, and a second member accepts such a connection. This connection then becomes part of each member's social map, and is used in conjunction with various features of the online social networking system.

At 744A, the online social networking system extracts a feature from a profile of the member who shared the item and extracts a feature from a profile of the member who received the shared item. As indicated at 744A1, this feature could include information relating to the education background of the members, the professional background of the members, the personal background of the members, or any other data that can be found in the profile of the members. At 744B, the online social networking system compares the feature of the member who shared the item with the feature of the member who received the shared item. At 744C, the online social networking system determines the promotion of the shared item, based on the comparison, in the feed of the member who received the shared item. For example, if the member who shared the item and the member who received the shared item both attended the same university and/or both worked for the same company, this would cause the online social networking system to give the shared item a more prominent position in the feed of the member who received the shared item.

At 746, the online social networking system determines the promotion of the shared item in the feed of the member who received the shared item based on interaction features between the members. For example, such an interaction feature could include an indication that one of the members has indicated that he or she likes the other member's updates to the other member's profile. If the member has taken the time to indicate a liking to the other member's updates to his or her profile, it is then more likely that this member with provide a social incentive in response to the sharing of the item by the member.

At 748A, the online social networking system determines the frequency that the member, who has received the shared item, has provided social incentives. At 748B, the online social networking system promotes the shared item in the feed of the member who received the shared item based on the frequency that the member who received the shared item provides social incentives. That is, a member who more frequently provided social incentives is more likely to continue to provide social incentive, and this provision of social incentives can further be encouraged for example by placing the shared item more prominently in the feed of the member who received the shared item.

Figure 8:
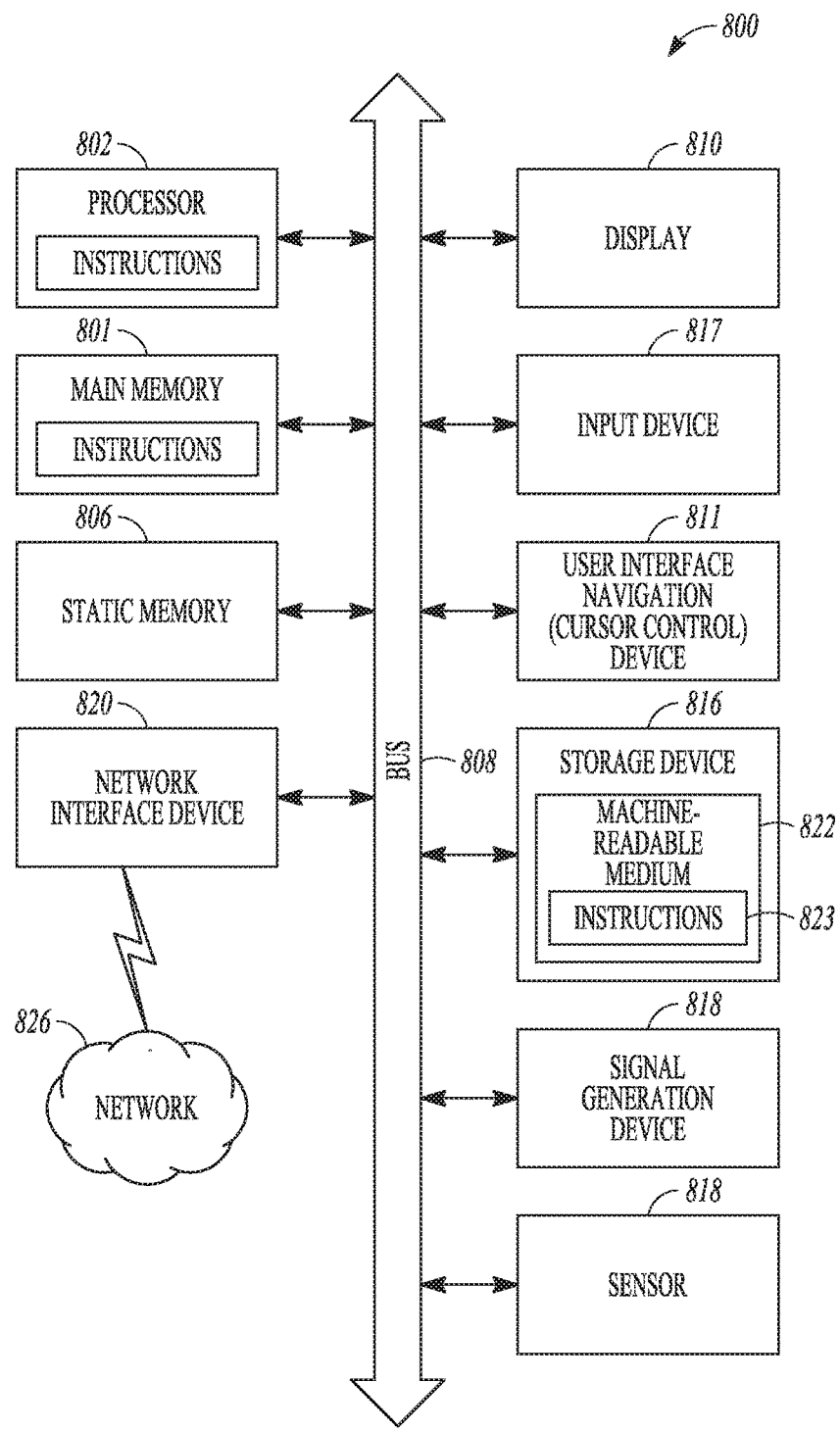
FIG. 8 is a block diagram of a machine in the form of a computing device within which a set of instructions, for causing the machine to perform any one or more of the methodologies discussed herein, may be executed.

FIG. 8 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 801 and a static memory 806, which communicate with each other via a bus 808. The computer system 800 may further include a display unit 810, an alphanumeric input device 817 (e.g., a keyboard), and a user interface (UI) navigation device 811 (e.g., a mouse). In one embodiment, the display, input device and cursor control device are a touch screen display. The computer system 800 may additionally include a storage device 816 (e.g., drive unit), a signal generation device 818 (e.g., a speaker), a network interface device 820, and one or more sensors 821, such as a global positioning system sensor, compass, accelerometer, or other sensor.

The drive unit 816 includes a machine-readable medium 822 on which is stored one or more sets of instructions and data structures (e.g., software 823) embodying or utilized by any one or more of the methodologies or functions described herein. The software 823 may also reside, completely or at least partially, within the main memory 801 and/or within the processor 802 during execution thereof by the computer system 800, the main memory 801 and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 823 may further be transmitted or received over a communications network 826 using a transmission medium via the network interface device 820 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration; and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A social networking system comprising: one or more processors; and
a computer readable non-transitory medium storing instructions that, when executed by the one or more processors, cause the system to perform operations comprising:
receive from a member of the social networking system an item for sharing on the social networking system;
determine whether the member has never shared an item on the social networking system such that the item for sharing is a first sharing for the member or whether the member has not shared an item for a time period that transgresses a threshold, when the item for sharing is a first sharing or a sharing that transgresses the threshold, mark the item for a promotion in a feed of another member of the social networking system;
promote the item for sharing without damaging a feed experience of the other member; and
avoid damaging the feed experience of the other member by limiting a number of infrequent sharers in the feed of the other member.

2. The social networking system of claim 1, comprising instructions to cause the system to place the item at a top position of the feed of the other member.

3. The social networking system of claim 1, comprising instructions to cause the system to receive a social incentive from the other member, and to display the social incentive to the member.

4. The social networking system of claim 3, wherein the social incentive comprises one or more of an indication to the member that the other member liked the item for sharing, a comment by the other member on the item for sharing, and a transmission of the item for sharing to one or more third members of the social networking system.

5. The social networking system of claim 1, wherein the member and the other member of the social networking system are connected in the social networking system.

6. The social networking system of claim 1, comprising instructions to cause the system to:
extract a feature from a profile of the member; extract a feature from a profile of the other member;
compare the feature of the member with the feature of the other member, and determine the promotion of the item for sharing in the feed of the other member based on the comparison.

7. The system of claim 6, wherein the feature comprises one or more of an educational background, a professional background, and a personal background.

8. The system of claim 1, comprising instructions to cause the system to determine the promotion of the item for sharing in the feed of the other member based on interaction features between the member and the other member including an indication that the member likes the other member's updates to the other member's profile or the other member likes the member's updates to the member's profile.

9. The social networking system of claim 1, comprising instructions to cause the system to:
determine a frequency of providing social incentives by the other member; and
promote the item for sharing in the feed of the other member based on the frequency that the other member provides social incentives.

10. A process comprising:
receiving from a member of a social networking system an item for sharing on the social networking system;
determining whether the member has never shared an item on the social networking system such that the item for sharing is a first sharing for the member or whether the member has not shared an item for a time period that transgresses a threshold;
when the item for sharing is a first sharing or a sharing that transgresses the threshold, marking the item for a promotion in a feed of another member of the social networking system; promoting the item for sharing without damaging a feed experience of the other member; and
avoiding damaging the feed experience of the other member by limiting a number of infrequent sharers in the feed of the other member.

11. The process of claim 10, comprising placing the item at a top position of the feed of the other member.

12. The process of claim 10, comprising receiving a social incentive from the other member, and displaying the social incentive to the member;
wherein the social incentive comprises one or more of an indication to the member that the other member liked the item for sharing, a comment by the other member on the item for sharing, and a transmission of the item for sharing to one or more third members of the social networking system.

13. The process of claim 10, wherein the member and the other member of the social networking system are connected in the social networking system.

14. The process of claim 10, comprising: extracting a feature from a profile of the member; extracting a feature from a profile of the other member;
comparing the feature of the member with the feature of the other member; and determining the promotion of the item for sharing in the feed of the other member based on the comparison.

15. The process of claim 14, wherein the feature comprises one or more of an educational background, a professional background, and a personal background.

16. The process of claim 10, comprising determining the promotion of the item for sharing in the feed of the other member based on interaction features between the member and the other member including an indication that the member likes the other member's updates to the other member's profile or the other member likes the member's updates to the member's profile.

17. The process of claim 10, comprising:
  determining a frequency of providing social incentives by the other member, and promoting the item for sharing in the feed of the other member based on the frequency that the other member provides social incentives.

\* \* \* \* \*